(12) United States Patent
Jenkins et al.

(10) Patent No.: US 7,680,096 B2
(45) Date of Patent: Mar. 16, 2010

(54) SYSTEM FOR CONFIGURING SWITCHES IN A NETWORK

(75) Inventors: Timothy Jenkins, Kinburn (CA); Robert Craig, Ottawa (CA)

(73) Assignee: QNX Software Systems GmbH & Co. KG, Karlsbad (DE)

( * ) Notice: Subject to any disclaimer, the term of this patent is extended or adjusted under 35 U.S.C. 154(b) by 742 days.

(21) Appl. No.: 11/262,384

(22) Filed: Oct. 28, 2005

(65) Prior Publication Data

US 2007/0097881 A1 May 3, 2007

(51) Int. Cl.
 *H04L 12/28* (2006.01)
(52) U.S. Cl. .................. 370/351; 370/254; 711/162
(58) Field of Classification Search ............ 370/254, 370/230, 235, 216, 244, 351; 711/162
See application file for complete search history.

(56) References Cited

U.S. PATENT DOCUMENTS

| | | | |
|---|---|---|---|
| 4,887,204 | A | 12/1989 | Johnson et al. |
| 4,897,781 | A | 1/1990 | Chang et al. |
| 5,253,342 | A | 10/1993 | Blount et al. |
| 5,442,785 | A | 8/1995 | Roffe et al. |
| 5,452,447 | A | 9/1995 | Nelson et al. |
| 5,548,760 | A | 8/1996 | Healey |
| 5,566,302 | A | 10/1996 | Khalidi et al. |
| 5,566,337 | A | 10/1996 | Szymanski et al. |
| 5,574,903 | A | 11/1996 | Szymanski et al. |
| 5,577,251 | A | 11/1996 | Hamilton et al. |

(Continued)

FOREIGN PATENT DOCUMENTS

EP 1 517 575 A2 3/2005

(Continued)

OTHER PUBLICATIONS

McKenny, M. et al., "Transporting multiple classes of traffic over a generic routing device—An investigation into the performance of the RapidIO™ interconnect architecture," 2003 IEEE, pp. 39-44.

(Continued)

*Primary Examiner*—Dang T Ton
*Assistant Examiner*—Wei Zhao
(74) *Attorney, Agent, or Firm*—Brinks, Hofer Gilson & Lione

(57) ABSTRACT

A network is set forth that comprises a plurality of multiple port switches, a plurality of endpoint devices connected to the ports of the plurality of switches, and an enumerating endpoint device that is connected to at least one of the multiple port switches. The enumerating endpoint device configures the routing through the multiple port switches based on whether the multiple port switch is on path with respect to a newly discovered processing element or off path with respect to the newly discovered processing element. Each off path switch may be configured so that communication packets destined for the new processing element are routed through the port of the off path switch that the off path switch uses for communications with the enumerating endpoint device. Each on path switch may be configured so that communication packets destined for the newly discovered processing element are routed through the port of the on path switch at which the enumerating endpoint device discovered the new processing element. In one example, the network is implemented as a RapidIO network.

12 Claims, 4 Drawing Sheets

U.S. PATENT DOCUMENTS

| | | | |
|---|---|---|---|
| 5,581,705 A | 12/1996 | Passint et al. | |
| 5,590,334 A | 12/1996 | Saulpaugh et al. | |
| 5,734,903 A | 3/1998 | Saulpaugh et al. | |
| 5,787,251 A | 7/1998 | Hamilton et al. | |
| 5,790,804 A | 8/1998 | Osborne | |
| 5,802,288 A | 9/1998 | Ekanadham et al. | |
| 5,991,820 A | 11/1999 | Dean | |
| 6,047,323 A | 4/2000 | Krause | |
| 6,049,838 A | 4/2000 | Miller et al. | |
| 6,157,961 A | 12/2000 | Kessler et al. | |
| 6,321,279 B1 | 11/2001 | Bonola | |
| 6,356,904 B1 | 3/2002 | Moriyama | |
| 6,385,659 B1 | 5/2002 | Tuel, Jr. | |
| 6,393,497 B1 | 5/2002 | Arnold et al. | |
| 6,412,018 B1 | 6/2002 | Tuel, Jr. | |
| 6,415,332 B1 | 7/2002 | Tuel, Jr. | |
| 6,434,459 B2 | 8/2002 | Wong et al. | |
| 6,446,070 B1 | 9/2002 | Arnold et al. | |
| 6,466,947 B2 | 10/2002 | Arnold et al. | |
| 6,466,996 B1 | 10/2002 | Bonola | |
| 6,487,607 B1 | 11/2002 | Wollrath et al. | |
| 6,513,049 B1 | 1/2003 | Moriyama | |
| 6,519,594 B1 | 2/2003 | Li | |
| 6,643,650 B1 | 11/2003 | Slaughter et al. | |
| 6,647,423 B2 | 11/2003 | Regnier et al. | |
| 6,697,876 B1 | 2/2004 | Van der Veen et al. | |
| 6,728,722 B1 | 4/2004 | Shaylor | |
| 6,731,601 B1 * | 5/2004 | Krishna et al. | 370/230 |
| 6,748,452 B1 | 6/2004 | Elphinstone et al. | |
| 6,757,903 B1 | 6/2004 | Havemose | |
| 6,757,904 B1 | 6/2004 | Woodruff et al. | |
| 6,785,892 B1 | 8/2004 | Miller et al. | |
| 6,789,077 B1 | 9/2004 | Slaughter et al. | |
| 6,789,126 B1 | 9/2004 | Saulpaugh et al. | |
| 6,792,466 B1 | 9/2004 | Saulpaugh et al. | |
| 6,850,979 B1 | 2/2005 | Saulpaugh et al. | |
| 6,959,264 B2 | 10/2005 | Mandal | |
| 6,981,244 B1 | 12/2005 | Kathail et al. | |
| 6,985,951 B2 | 1/2006 | Kubala et al. | |
| 6,993,746 B2 | 1/2006 | Hue | |
| 7,058,955 B2 | 6/2006 | Porkka | |
| 2002/0069302 A1 | 6/2002 | Porkka | |
| 2002/0129172 A1 | 9/2002 | Baskey et al. | |
| 2002/0147785 A1 | 10/2002 | Venkatsubramanian et al. | |
| 2002/0161848 A1 | 10/2002 | Willman et al. | |
| 2003/0033427 A1 | 2/2003 | Brahmaroutu | |
| 2003/0041096 A1 | 2/2003 | Johnson | |
| 2003/0115366 A1 | 6/2003 | Robinson | |
| 2004/0078543 A1 | 4/2004 | Koning et al. | |
| 2004/0083317 A1 | 4/2004 | Dickson et al. | |
| 2004/0216135 A1 | 10/2004 | Heimbeck | |
| 2005/0044151 A1 | 2/2005 | Jiang et al. | |
| 2005/0149601 A1 | 7/2005 | Cox et al. | |
| 2005/0201272 A1 * | 9/2005 | Wang et al. | 370/216 |
| 2005/0268300 A1 | 12/2005 | Lamb et al. | |
| 2006/0047875 A1 | 3/2006 | Aguilar et al. | |
| 2006/0095724 A1 | 5/2006 | Singh | |
| 2006/0106995 A1 | 5/2006 | Shen | |
| 2006/0150200 A1 | 7/2006 | Cohen et al. | |
| 2006/0182137 A1 | 8/2006 | Zhou et al. | |
| 2006/0259671 A1 * | 11/2006 | Swartzentruber | 710/104 |
| 2006/0277284 A1 | 12/2006 | Boyd | |
| 2006/0277285 A1 | 12/2006 | Boyd | |

FOREIGN PATENT DOCUMENTS

WO    WO 00-24205 A1    4/2000

OTHER PUBLICATIONS

Strass, H., "Abschied vom Bus: RapidIO," *Electronik*, vol. 49, No. 24, Nov. 28, 2000, pp. 52-55.

European Search Report dated Jan. 2, 2007, for corresponding international application No. EP 06 021 843.5.

* cited by examiner

SYSTEM FOR CONFIGURING SWITCHES IN A NETWORK

BACKGROUND OF THE INVENTION

1. Technical Field

The present invention is directed to network systems and, more particularly, to a system for configuring switches in a network.

2. Related Art

Various standards have been developed for network developments. One such standard is known as RapidIO. RapidIO is an open-standard, switched fabric that has substantial use in embedded computing environments. Embedded computing systems using RapidIO technology include wireless infrastructures, edge networking systems, storage systems, as well as scientific, military and industrial equipment.

RapidIO networks include a number of processing elements (PEs) that are interconnected by point-to-point links. The PEs may include switch devices and endpoint devices. In a typical RapidIO network topology, the endpoint devices are interconnected with one another through a fabric formed by the switch devices. Endpoint devices communicate with one another using data packets that, among other things, include an identification of the source and destination endpoint devices. The switch devices of the network use the destination data to route the data packet to the proper endpoint device. In a RapidIO system, each switch device of the network includes at least one routing table that is used to control the I/O fabric of the switch so that it relays a received data packet to the proper output port based on the destination endpoint.

On start up, the RapidIO network executes a process to identify and initialize the various components that constitute the network. During the enumeration process, the routing tables of the switches are established. To this end, at least one PE on the network is designated as an enumerating endpoint. The enumerating endpoint queries for the presence of other PEs on the network. When the enumerating endpoint detects a switch on the network, it records the total number of ports on the switch and the port number through which it reached the switch. The remaining ports of the detected switch may then be checked to determine whether other PEs are attached to these remaining ports. If a PE is detected, the enumerating endpoint queries the detected PE to determine whether it is an endpoint device or a switch device.

The next series of steps executed by the enumerating endpoint depends on the result of the PE type query. If the detected PE is a switch device, the enumerating endpoint continues to check all of the ports of the newly detected switch to determine whether other PEs are attached to the ports and, if necessary, executes a further PE type query. This querying of individual switches and switch ports is conducted as a branch type operation where the querying of a branch continues until an endpoint PE is detected. Once the detected PE is an endpoint device, the enumerating endpoint assigns a base device ID to the endpoint device and updates the corresponding routing tables in the switch devices of the network. This process may be executed recursively by the enumerating endpoint for each PE located on the RapidIO network until every port of every switch has been queried.

Pseudocode may be used as an example to implement an enumerating process in a RapidIO network, to assign base device IDs to each endpoint, and to configure the routing tables of the switching devices is discussed and illustrated in *RapidIO™ Interconnect Specification Annex* 1: *Software/ System Bring Up Specification*, Rev. 1.3, February 2005. The processing represented by this pseudocode, however, has several deficiencies. For example, the process does not describe the enumeration of devices appearing on the network after the initial enumeration is completed. Further, the process does not properly configure routing tables for some network topologies. For example, there are certain situations in which the discovery/enumeration sequence of endpoint devices will result in a network configuration in which two or more endpoint devices are unable to communicate. Finally, the process does not assign base device ID values to switch devices, thereby requiring implementation of complicated maintenance and management operations for the switch devices.

SUMMARY

A network is set forth that comprises a plurality of multiple port switches, a plurality of endpoint devices connected to the ports of the plurality of switches, and an enumerating endpoint device that is connected to at least one of the multiple port switches. The enumerating endpoint device configures the routing through multiple port switches based on whether the multiple port switch is on path with respect to a newly discovered processing element or off path with respect to the newly discovered processing element. Each off path switch may be configured so that communication packets destined for the new processing element are routed through the port of the off path switch that the off path switch uses for communications with the enumerating endpoint device. Each on path switch may be configured so that communication packets destined for the newly discovered processing element are routed through the port of the on path switch at which the enumerating endpoint device discovered the new processing element. The network may be implemented as a RapidIO network.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
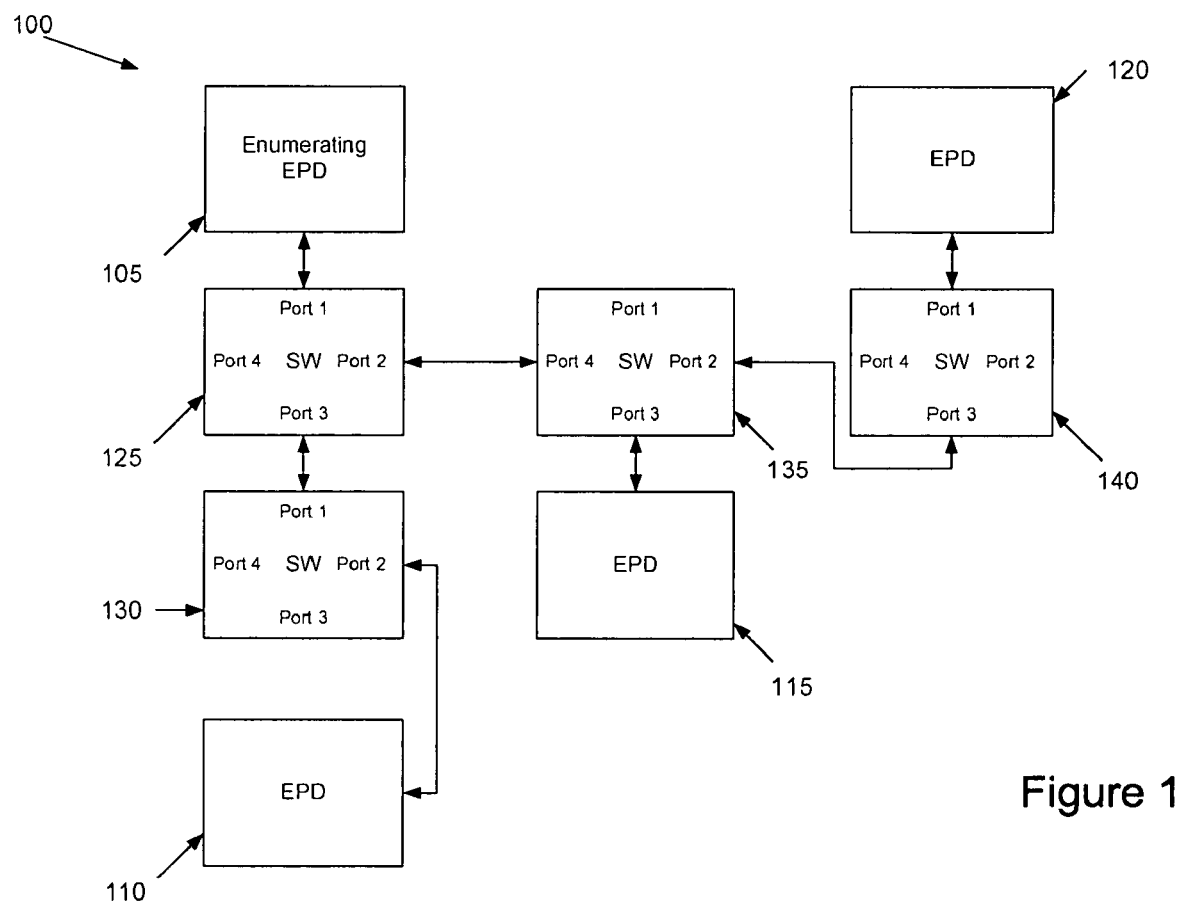
FIG. 1 is an exemplary network that may execute an enumeration process.

FIG. 1 is an exemplary network system, shown generally at 100. The system 100 includes a number of different endpoint devices 105, 110, 115, and 120 that are connected to a network switching fabric. The network switching fabric includes a number of multiple port switching devices 125, 130, 135, and 140 that are responsible for routing communication packets between the endpoint devices 105, 110, 115, and 120 as well as communication packets sent from an endpoint device to one of the multiple port switches of the network 100. In the illustrated system 100, each of the switching devices 125, 130, 135, and 140 includes four bidirectional communication ports, where each bidirectional communication port includes an input section adapted to receive communication packets and an output section adapted to transmit communication packets. The input section and output section of a given port may be operationally paired with one another so that a single bidirectional communication port may be dedicated for communication with a single processing element of the system 100. However, the input section of any port of a switching device may be configured to connect to any output of the remaining ports of the switch through a switching fabric that is interior to the switching device.

Configuration of the internal switching fabric of the switching devices is placed under the control of enumerating endpoint device 105. enumerating endpoint device 105 executes an enumeration process during initialization of system 100. Device 105 also may execute an enumeration process after initialization to dynamically configure the system 100 in response to the addition and/or removal of an endpoint device.

During the enumeration process, the enumerating endpoint device 105 discovers endpoint devices and configures the switches so that each endpoint device may communicate with every other endpoint device on the system 100. One manner in which device 105 may execute the enumeration process is illustrated generally at 200 of FIG. 2. As shown, the enumeration process may initiate a search for a new processing element at step 205. In the exemplary process of FIG. 2, a new processing element is an endpoint device that the enumerating endpoint device 105 has yet to fully enumerate by configuring the switching fabric of the system 100. If a new processing element is not found at step 210 and the enumeration process has completed searching all ports of all switching devices for new processing elements, then endpoint device 105 may exit the enumeration process at step 215.

If a new processing element is found at step 210, then the enumerating endpoint device 105 proceeds to update the switching devices of the system 100. In the exemplary process shown in FIG. 2, the switching devices of the system 100 may be configured by the device 105 so that bidirectional communications may take place between the newly discovered endpoint device and each endpoint device that has been fully enumerated.

The manner in which a switching device is configured by the enumerating endpoint device 105 depends on whether the switching device is an "on path switch" or an "off path switch" with respect to the newly discovered endpoint device that is being enumerated. A switch is considered to be an on path switch when the switch is included in a communication path between the enumerating endpoint device 105 and the newly discovered endpoint device. Otherwise, a switch is considered to be an off path switch.

The distinction between on path switching devices and off path switching devices can be illustrated with reference to system 100 of FIG. 1. In system 100, switching devices 125 and 130 are on path switches with respect to endpoint device 110 while switching devices 135 and 140 are off path switches with respect to endpoint device 110. Similarly, switching devices 125 and 135 are on path switches with respect to endpoint device 115 while switching devices 130 and 140 are off path switches with respect to endpoint device 115. Finally, switching devices 125, 135 and 140 are on path switches with respect to endpoint device 120 while switching device 130 is an off path switch with respect to endpoint device 120.

Figure 2:
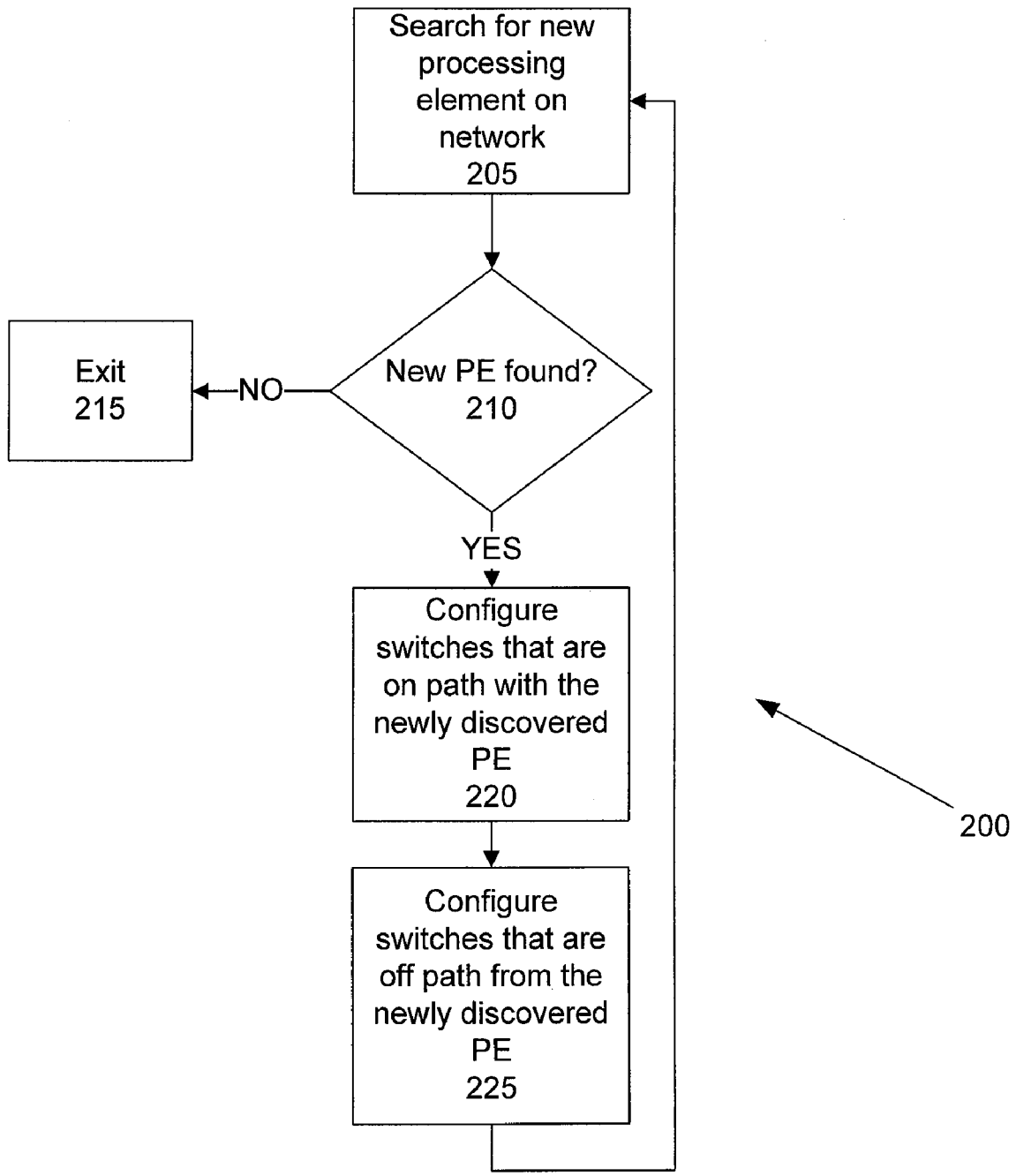
FIG. 2 is an enumerating process.

The configuration of switching devices that are on path with respect to the newly discovered processing element occurs at step 220 of FIG. 2. In this process, the on path switches are configured so that communication packets destined for the newly discovered processing element are routed through the port of the on path switch at which the processing element was discovered.

The configuration of switching devices that are off path with respect to the newly discovered processing element occurs at step 225 of FIG. 2. In this process, the off path switches are configured so that communication packets that are destined for the newly discovered processing element are routed through the same port of the off path switch that the off path switch uses to communicate with enumerating endpoint device 105.

The system of FIG. 1 may be used to show one manner of practically applying the enumeration process of FIG. 2. It may be assumed that endpoint device 110 constitutes a processing element that has just been discovered by the enumerating endpoint device 105 during the enumeration process, and that endpoint devices 115 and 120 have previously been fully enumerated by device 105.

As noted above, switching devices 125 and 130 are on path switches with respect to endpoint device 110 while switching devices 135 and 140 are off path switches with respect to endpoint device 110. The manner in which switching devices 125 and 130 are configured for routing communications for endpoint device 110 differs from the manner in which switching devices 135 and 140 are configured.

In accordance with the process of FIG. 2, switching devices 125 and 130 are configured by device 105 so that communication packets destined for endpoint device 110 are routed through the port of the on path switch at which the endpoint was discovered by device 105. Consequently, switching device 125 is configured to direct communication packets that are destined for endpoint device 110 to Port 3 of device 125. Similarly, switching device 130 is configured to direct communication packets that are destined for endpoint device 110 to Port 2 of device 130.

Off path switching devices 135 and 140 are configured by device 105 so that communication packets destined for endpoint device 110 are routed through the same port of the switch that is used for routing communications destined for the enumerating endpoint device 105. Consequently, switching device 135 is configured to direct communication packets that are destined for endpoint device 110 to Port 4 of device 135. Similarly, switching device 140 is configured to direct communication packets that are destined for endpoint device 110 to Port 3 of device 140.

Once the switching devices 125, 130, 135 and 140 have been configured in this manner, endpoint device 110 may receive communication packets from any of the other endpoint devices 105, 115, and 120. For example, communications initiated by endpoint device 105 that are destined for device 110 are received at Port 1 of switching device 125. Switching device 125 recognizes the communication packet as a packet that is destined for endpoint device 110 and routes the packet to Port 3 where it is transmitted to Port 1 of switching device 130. Switching device 130 also recognizes that the communication packet is destined for endpoint device 110 and routes the packet to Port 2, where the packet is received by endpoint device 110.

The operation of off path switching devices can be understood by considering the case when endpoint device 115 sends communication packets destined for endpoint device 110. Endpoint device 115 sends its communication packets to Port 3 of switching device 135. As previously noted, switching device 135 has been configured as an off path switching device with respect to endpoint device 110. Consequently, it routes communications destined for device 110 to the same port that the switching device uses to communicate with the enumerating endpoint device 105. In this case, that port may be Port 4 of device 135. The communication packet that is transmitted at Port 4 of device 135 is received at Port 2 of switching device 125 which, in turn, is configured to direct communications destined for endpoint device 110 to Port 3. The communication packets are then received at Port 1 of switching device 130 where they are routed to Port 2 of the same device. Port 2 of switching device 130 is connected to provide the communication packets to endpoint device 110.

Figure 3:
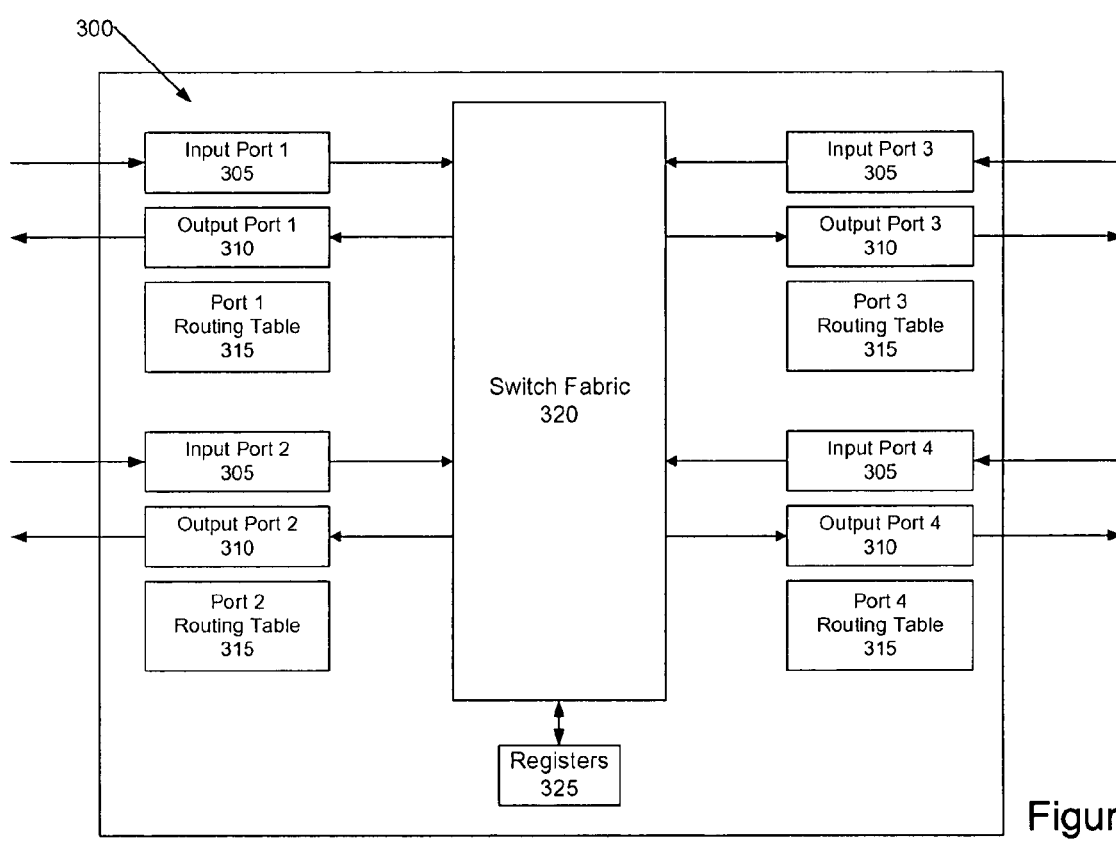
FIG. 3 is an exemplary switch that may be used in the exemplary network shown in FIG. 1.

FIG. 3 shows an exemplary architecture that may be used to implement each of the individual switching devices 125, 130, 135 and 140. This architecture may be used, for example, when system 100 is designed as a RapidIO network. Commercially available RapidIO switching devices implemented using this exemplary architecture include the Tsi500™ Multi-Port RapidIO switch available from Tundra Semiconductor Corporation.

The switching device 300 of FIG. 3 includes four bidirectional ports. The bidirectional polls are comprised of an input port 305 that receives communication packets from an external source and an output port 310 that transmits routed communication packets to an external destination. Communication packets are internally routed from the input port 305 of one bidirectional port to the output port 310 of another bidirectional port through internal switch fabric 320.

A routing table 315 is respectively associated with each bidirectional port. When a communication packet is received at one of the input ports 305, the destination information (i.e., the endpoint device identifier) included in the packet is compared to the information stored in the routing table 315 to determine which output port 310 the switch will use to relay the received communication package. Although switching device 300 uses a routing table for each bidirectional port, other switch architectures may be implemented that, for example, employ a single routing table.

Switch 300 may also include one or more registers 325 that are accessible to the enumerating endpoint device 105. The registers 325 may be used as capability registers that, among other things, identify the device type as well as its processing capabilities. One or more of the registers may also be used to store a base device ID that may be assigned by the enumerating endpoint device 105 during the enumeration process.

Figure 4:
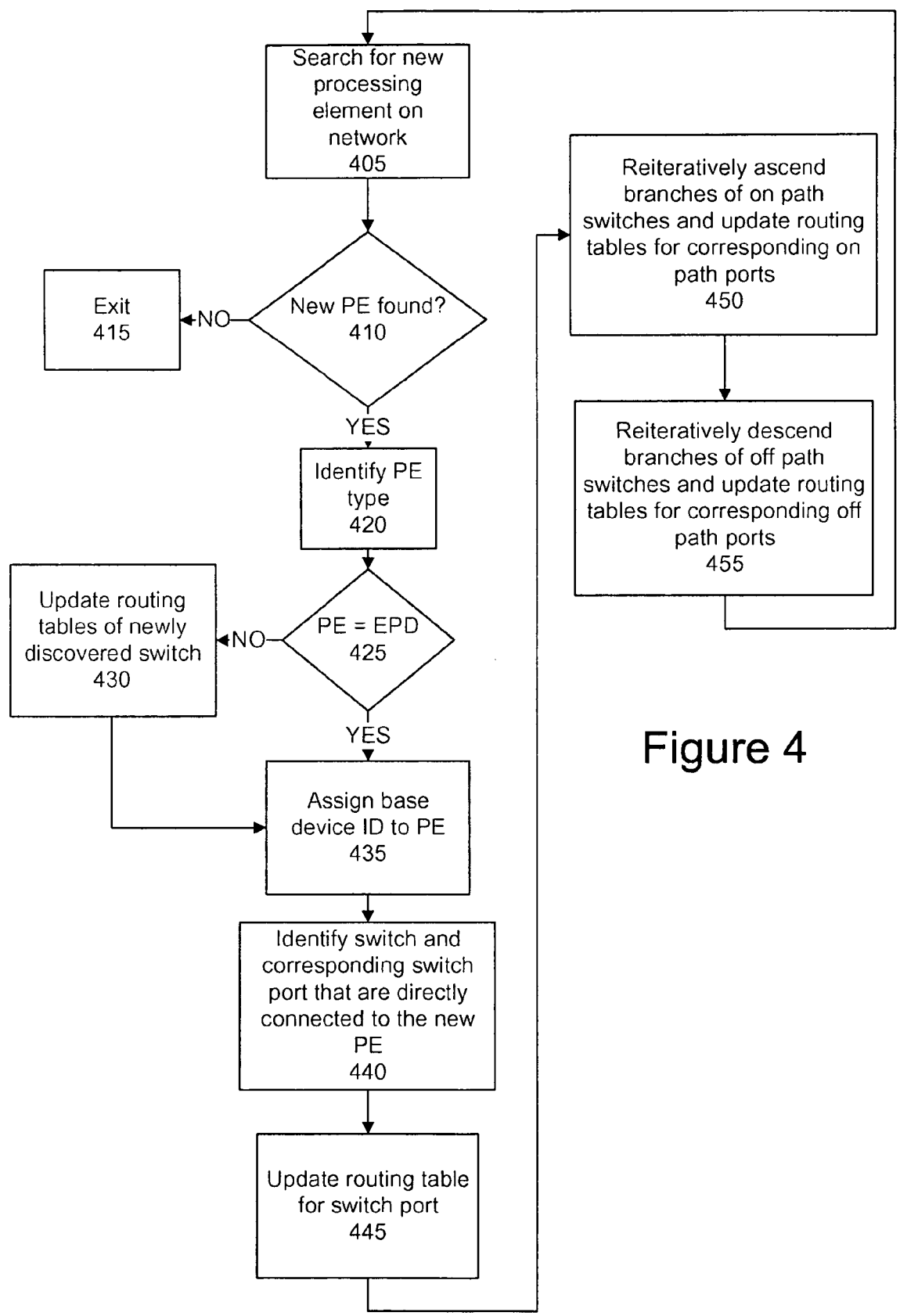
FIG. 4 is an enumerating process that may be used to configure on path switches and off path switches in the exemplary network of FIG. 1 when the switches are constructed in the manner shown in FIG. 3.

FIG. 4 is a further exemplary enumeration process that may be used in system 100. This enumeration process is particularly well-suited for implementation in RapidIO networks that employ switching devices of the type shown in FIG. 3. In accordance with this exemplary process, the enumerating endpoint device 105 searches the system 100 for new processing elements at step 405. If a new processing element is not found at step 410 and the enumeration process has completed searching all ports of all switching devices for new processing elements, then endpoint device 105 may exit the enumeration process at step 415.

If a new processing element is found at step 410, the enumerating endpoint device 105 queries the new processing element to determine its type. In this example, a distinction between the processing element types is made at step 425 based on whether the processing element is a switching device or an endpoint device. The enumerating endpoint device 105 may determine the processing element type, for example, from the capability registers of the processing element. If the newly discovered processing element is a switching device, the enumerating endpoint device 105 may update the routing tables of the newly discovered switch at step 430. The routing tables of the newly discovered switch are updated to establish communication paths from each port of the newly discovered switching device to each endpoint device and switch that has been fully enumerated with a base device ID. If the enumeration process has completed searching all ports of all switching devices for new processing elements, then endpoint device 105 may exit the enumeration process upon completion of step 430.

It the processing element is identified as an endpoint device at step 425, the enumerating endpoint device 105 assigns a base device ID to the endpoint device. Optionally, device 105 may assign a base device ID to the newly discovered switch at step 425 upon completion of step 430. This base device ID is used throughout system 100 for all future communications with the newly discovered processing element. For example, the base device ID may be included in the communication packets to identify the newly discovered processing element as the destination for the packets.

At step 440, the enumerating endpoint device 105 identifies the switching device and switch port that are directly connected to the new processing element. This information is used at step 445 to update the routing tables used by the switching device that is directly connected to the new processing element. Since this initial switching device will be an on path switch, the routing tables of the switching device are updated to direct all communication packets destined for the new processing element through the port identified at step 440. The routing tables for the remaining switching devices that are on path with respect to the new processing element are updated at step 450. Updating of the routing tables may be accomplished by reiteratively ascending the switches of the on path network branch until all on path switches have been updated. As above, the routing tables for each on path switching device are updated so that communication packets destined for the new processing element are routed through the port of the on path switch at which the new processing element was discovered. For example, the routing tables may be updated to store the base device ID for the new processing element, and this base device ID may be used by the switching device as an index to the correct switch port.

The routing tables for switching devices that are off path with respect to the new processing element are updated at step 455. In the illustrated example, the routing tables are updated by reiteratively descending the switches of each off path network branch until all off path switches have been updated. The routing tables for each off path switching device are updated so that communication packets destined for the new processing element are routed through the same port that the off path switching device uses to communicate with the enumerating endpoint device 105. Again, the routing tables may be updated to store the base device ID for the new endpoint device and this base device ID may be used by the switching device as an index to the correct switch port.

The system 100 may execute an initial enumerating process as part of its startup sequence. Subsequent enumerating processes may be executed from time to time on a repeating bases to determine whether endpoint devices have been added to the system 100 and/or removed from the system. For example, detection of new endpoint devices may occur during a polling process in which the enumerating endpoint device 105 searches the network to discover endpoint devices added after completion of the initial enumeration process. Further, the switching devices of the system may be designed to automatically provide an indication to device 105 that a new processing element has been added to one of its ports or that a processing element has been removed from one of its ports.

The foregoing enumeration process is suitable for use in a wide range of network topologies. Although the exemplary enumeration process has been described in connection with a non-looped network topology, the process may also be adapted for use in looped network configurations.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A network comprising:

a plurality of multiple port switches;

a plurality of endpoint devices connected to ports of the multiple port switches;

an enumerating endpoint device connected to at least one of the multiple port switches, where the enumerating endpoint device configures internal routing of communication packets between the ports of each multiple port switch based on whether the multiple port switch is on path with respect to an endpoint device or off path with respect to the endpoint device, where the enumerating endpoint device treats a multiple port switch as an on path multiple port switch with respect to the endpoint device if the multiple port switch is in a communication path between the enumerating endpoint device and the endpoint device when the endpoint device is initially detected by the enumerating endpoint device, and where the enumerating endpoint device treats the multiple port switch as an off path multiple port switch with respect to the endpoint device if the multiple port switch is not in a communication path between the enumerating endpoint device and the endpoint device when the endpoint device is initially detected by the enumerating endpoint device; and where each off path switch is configured by the enumerating endpoint device so that communications for the endpoint device are routed through the port of the off path switch that the off path switch uses for communications with the enumerating endpoint device, and where each on path switch is configured by the enumerating endpoint device so that communications for the endpoint device are routed through the port of the on path switch at which the enumerating endpoint device detected the endpoint device.

2. A network comprising:

an enumerating endpoint device a plurality of switches, each switch having a plurality of I/O ports and at least one routing table, where the enumerating endpoint device is connected to at least one of the plurality of switches;

a plurality of endpoint devices connected to the plurality of switches;

where the enumerating endpoint device updates the routing tables of each of the switches upon detection of an endpoint device based on whether the switch is on path with respect to the detected endpoint device or off path with respect to the detected endpoint device, where a switch is treated by the enumerating endpoint device as an on path switch with respect to the endpoint device if the switch is in a communication path between the enumerating endpoint device and the endpoint device when the endpoint device is initially detected by the enumerating endpoint device, and where a switch is treated by the enumerating endpoint device as an off path switch with respect to the endpoint device if the switch is not in a communication path between the enumerating endpoint device and the endpoint device when the endpoint device is initially detected by the enumerating endpoint device; and where the routing table of each off path switch is configured by the enumerating endpoint device so that communications for the detected endpoint device are routed through the port of the off path switch that the off path switch uses for communications with the enumerating endpoint device, and where the routing table of each on path switch is configured by the enumerating endpoint device so that communications for the detected endpoint device are routed through the port of the on path switch at which the enumerating endpoint device detected the detected endpoint device.

3. The network of claim 2 where the detection of the endpoint device occurs during an initial enumeration process executed by the enumerating endpoint device.

4. The network of claim 2 where the detection of the endpoint device occurs during a polling process in which the enumerating endpoint device searches the network to discover newly added endpoint devices.

5. The network of claim 3 where the detection of the endpoint device occurs during a polling process in which the enumerating endpoint device searches the network to discover newly added endpoint devices that have been added after completion of the initial enumeration process, the polling process occurring on a repeating basis.

6. The network of claim 2 where the enumerating endpoint device assigns unique device identification values to each of the endpoint devices, and where the unique device identification values are used as indices in the routing tables.

7. A network comprising:

a plurality of endpoint devices;

a plurality of switches, each switch having a plurality of I/O ports, each I/O port having at least one routing table;

an enumerating endpoint device connected to a port on at least one of the plurality of switches, where the enumerating endpoint device responds to detection of an endpoint device by updating the routing tables of each of the plurality of switches, and where the routing table of an on path switch is updated so that communications with the detected endpoint device are routed to the port of the on path switch at which the detected endpoint device was discovered by the enumerating endpoint device, and where the routing table of an off path switch is updated so that communications with the detected endpoint device are routed through the port of the off path switch that the off path switch uses to communicate with the enumerating endpoint device; and where a switch is treated by the enumerating endpoint device as an on path switch with respect to the detected endpoint device if the switch is in a communication path between the enumerating endpoint device and the detected endpoint device when an effective endpoint device is initially detected by the enumerating endpoint device, and where a switch is treated by the enumerating endpoint device as an off path switch with respect to the detected endpoint device if the switch is not in a communication path between the enumerating endpoint device and the endpoint device when the endpoint device is initially detected by the enumerating endpoint device.

8. The network of claim 7 where the detection of the endpoint device occurs during an initial enumeration process executed by the enumerating endpoint device.

9. The network of claim 7 where the detection of the endpoint device occurs during a polling process in which the enumerating endpoint device searches the network to discover newly added endpoint devices.

10. The network of claim 8 where the detection of the endpoint device occurs during a polling process in which the enumerating endpoint device searches the network to discover newly added endpoint devices that have been added after completion of the initial memorization process, the polling process occurring on a repeating basis.

11. The network of claim 7 where the enumerating endpoint device assigns unique device identification values to each of the endpoint devices, and where the unique device identification values are used as indices in the routing tables.

12. In a network having an enumerating endpoint device and an endpoint device that is detected by the enumerating endpoint device, a switching structure comprising:

a plurality of multiple port switches that are on path with the detected endpoint device, each of the on path switches configured by the enumerating endpoint device for routing communications for the detected endpoint device to the port of the on path switch at which the detected endpoint device was discovered by the enumerating endpoint device; and a plurality of multiple port switches that are off path to the detected endpoint device, where the off path switches are configured by the enumerating endpoint device to route network communications to an on path switch to the port of the off path switch that the off path switch uses to communicate with the enumerating endpoint device; and where a multiple port switch is treated by the enumerating endpoint device as an on path multiple port switch with respect to the detected endpoint device if the multiple port switch is in a communication path between the enumerating endpoint device and the detected endpoint device when the detected endpoint device is initially detected by the enumerating endpoint device, and where a multiple port switch is treated by the enumerating endpoint device as an off path multiple port switch with respect to the detected endpoint device if the multiple port switch is not in a communication path between the enumerating endpoint device and the detected endpoint device when the endpoint device is initially detected by the enumerating endpoint device.

* * * * *